UNITED STATES PATENT OFFICE.

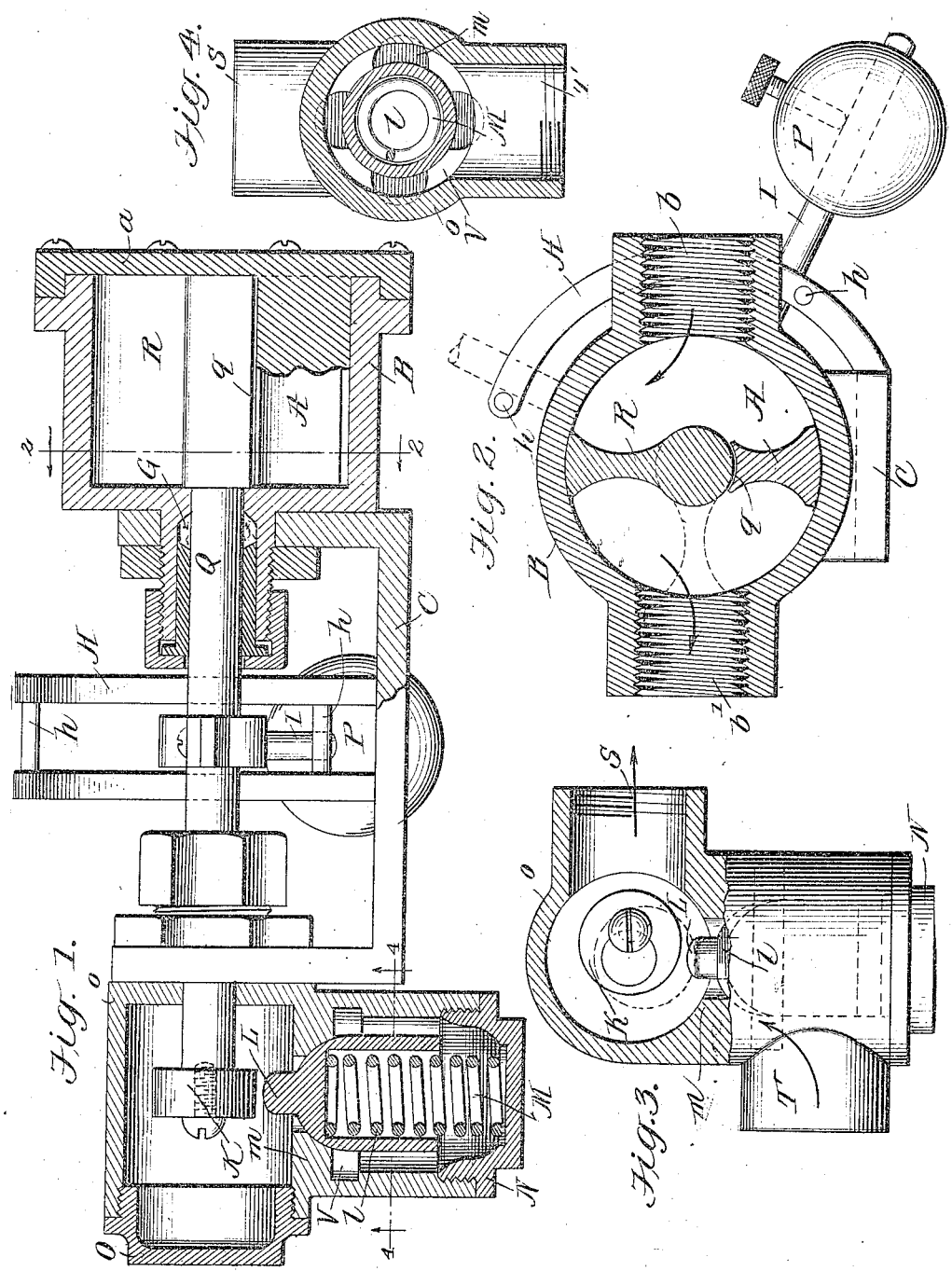

WILLIAM E. KAY, OF AMHERST, OHIO.

AUTOMATIC VALVE FOR WATER-HEATERS.

981,571.

Specification of Letters Patent.

Patented Jan. 10, 1911.

Application filed February 5, 1910. Serial No. 542,352.

*To all whom it may concern:*

Be it known that I, WILLIAM E. KAY, a citizen of the United States, and residing at Amherst, in the county of Lorain and State of Ohio, have invented a new and useful Improvement in Automatic Valves for Water-Heaters, of which the following is a specification.

This invention is a valve for automatic water heaters, and has for its object to provide an improved valve by means of which, when the water is turned on and off, the gas will be automatically turned on and off simultaneously.

A feature of the gas valve is that it is so shaped that it seats perfectly. Moreover it cannot stick in its seat, and fluctuations in the water pressure, incidental to the ordinary turning off and on of outlets in the water system, will not affect the valve.

The invention is illustrated in the accompanying drawings, in which—

Figure 1 is a longitudinal section of the valve. Fig. 2 is a section on line 2—2 of Fig. 1. Fig. 3 is an end view of the gas valve, partly in section. Fig. 4 is a section on line 4—4 of Fig. 1.

The water cylinder is indicated at B, and has an inlet $b$ and outlet $b'$ in opposite sides thereof. One end of the cylinder is closed by a head $a$ which has a half partition A integral therewith, extending across the cylinder. A rock shaft Q extends through a gland G in the opposite end of the cylinder, and carries a radial wing R within the cylinder. A small passage $q$ is provided between the shaft and the fixed partition A. A weight P is adjustably mounted on an arm I clamped to the shaft, and the rod swings between stops $h$ in a quadrant H supported by a yoke C which connects the water cylinder and the gas valve casing $o$. The rock shaft extends through a packing nut into said casing and has therein an eccentric or cam K adapted to bear upon the head L of the hollow barrel gas valve $l$, said head extending through the valve seat opening in the partition $m$ which divides the valve casing into two chambers. The valve is normally closed by a coil spring M which is held in the barrel by a screw cap N in the bottom of the casing. The upper chamber, in the drawings, has a screw cap O and the gas outlet S. The lower chamber has the gas inlet T.

In operation, when the water cock is turned on, the water entering cylinder B will cause wing R and shaft Q to turn until the water finds its outlet through $b'$, and the wing stays in this position while the water is running, the weight P being lifted. This causes the cam K to bear down on the valve L and open the same against the tension of its spring, allowing the gas to flow. When the water flow is stopped the weight turns the shaft back and the spring M closes the valve, the water pressure being equalized on both sides of the wing by leak through passage $q$. The stated construction of the gas valve allows the gas to pass on all sides, so the valve will not stick, and its tapered shape at the seat causes it to come to a perfect closure at all times. Guides V in the valve chamber prevent cocking and hold the valve in proper position to seat, and to receive the pressure of the cam, at all times. When water is not being drawn the cam K lifts out of contact with the valve and accordingly when there is any slight movement of the wing and shaft incident to fluctuation in water pressure caused by opening and closing cold water faucets, or otherwise, it does not affect the gas valve.

I claim—

1. The combination of a cylinder having a water inlet and outlet and a fixed partition extending partly across the same between said inlet and outlet, a rock shaft extending into the cylinder and having a wing between the inlet and outlet and adapted to turn when the flow of water through the cylinder is started, a weight secured to the shaft and adapted to be raised when the shaft is turned, a valve casing, a spring valve therein provided with a head, and a cam secured on said shaft within said valve casing normally spaced from said valve head but adapted to contact therewith to open the valve when the shaft is turned.

2. The combination of a cylinder having a water inlet and outlet and a fixed partition extending partly across the same between said inlet and outlet, a rock shaft extending into the cylinder and having a wing between the inlet and outlet and adapted to turn when the flow of water through the cylinder is started, a weight secured to the shaft and adapted to be raised when the shaft is turned, a valve comprising an upper and a lower chamber, a partition between said upper and lower chamber provided with an opening, a hollow valve disposed in said lower chamber and adapted to close said opening, said hollow valve being provided with a head, a spring within the interior of said hollow valve for keeping it in its closed position, and a cam within the upper chamber and secured to said shaft, said cam being normally spaced from said head but being adapted to be brought into engagement therewith when the shaft is turned.

WILLIAM E. KAY.

Witnesses:
 H. A. POUNDS,
 F. SCHAUWEKER.